June 25, 1929.  R. LA FRANCE  1,718,651
GLASS FORMING MACHINE
Filed Nov. 8, 1926   3 Sheets-Sheet 1
FIG-1-
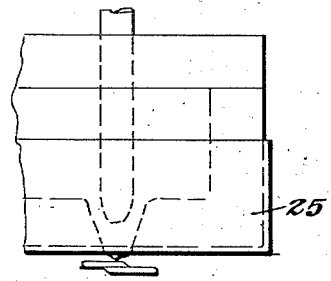
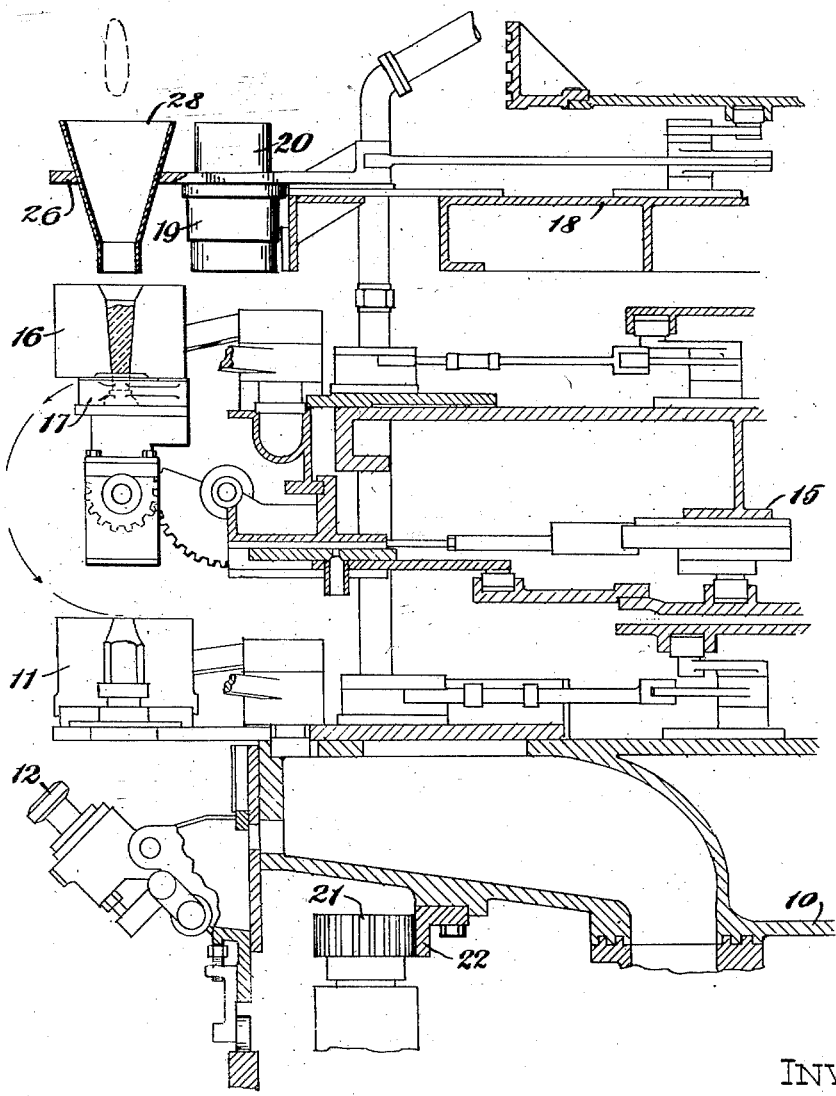
INVENTOR
Richard La France-
By J.F. Rule
His Atty

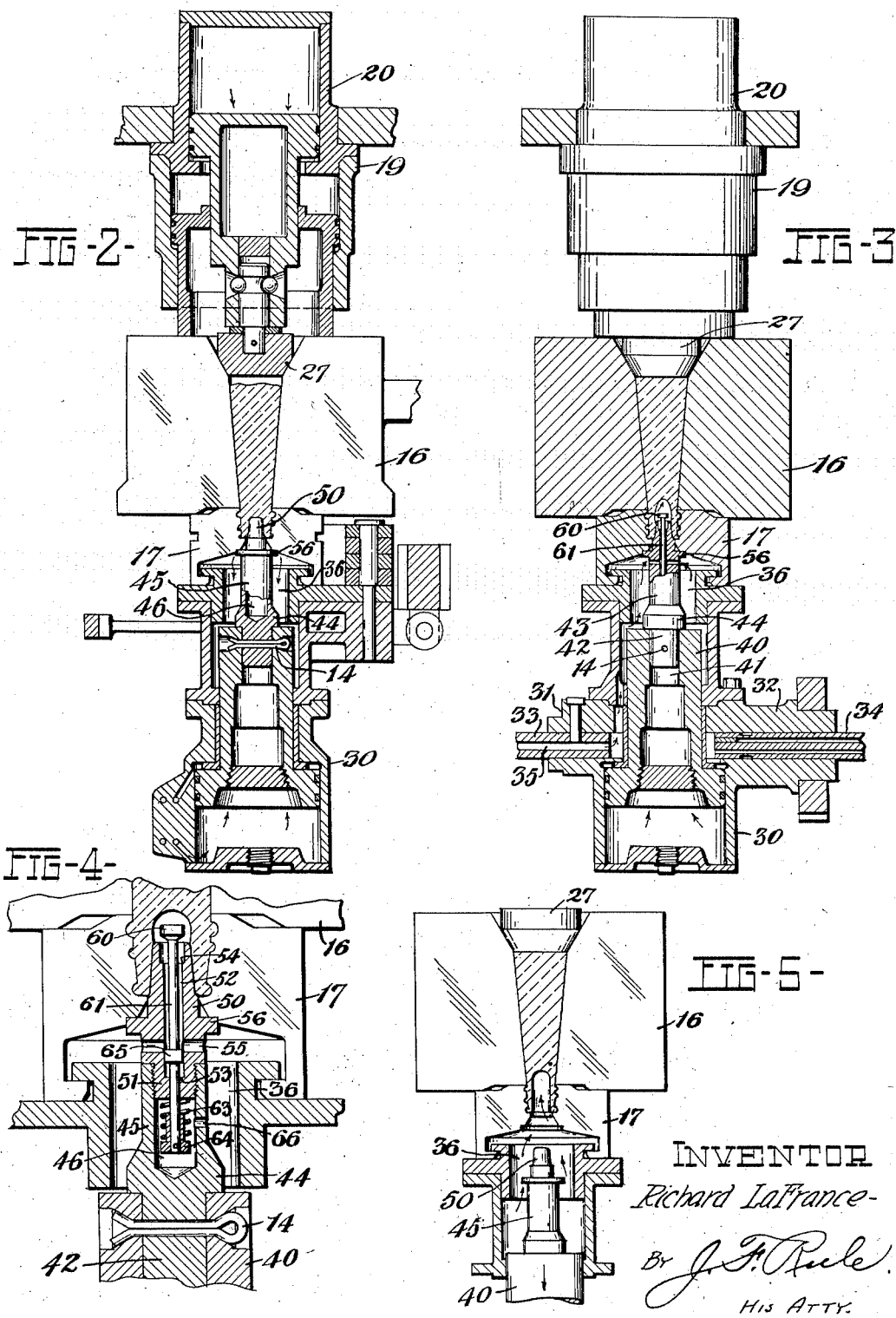

June 25, 1929.  R. LA FRANCE  1,718,651
GLASS FORMING MACHINE
Filed Nov. 8, 1926    3 Sheets-Sheet 3
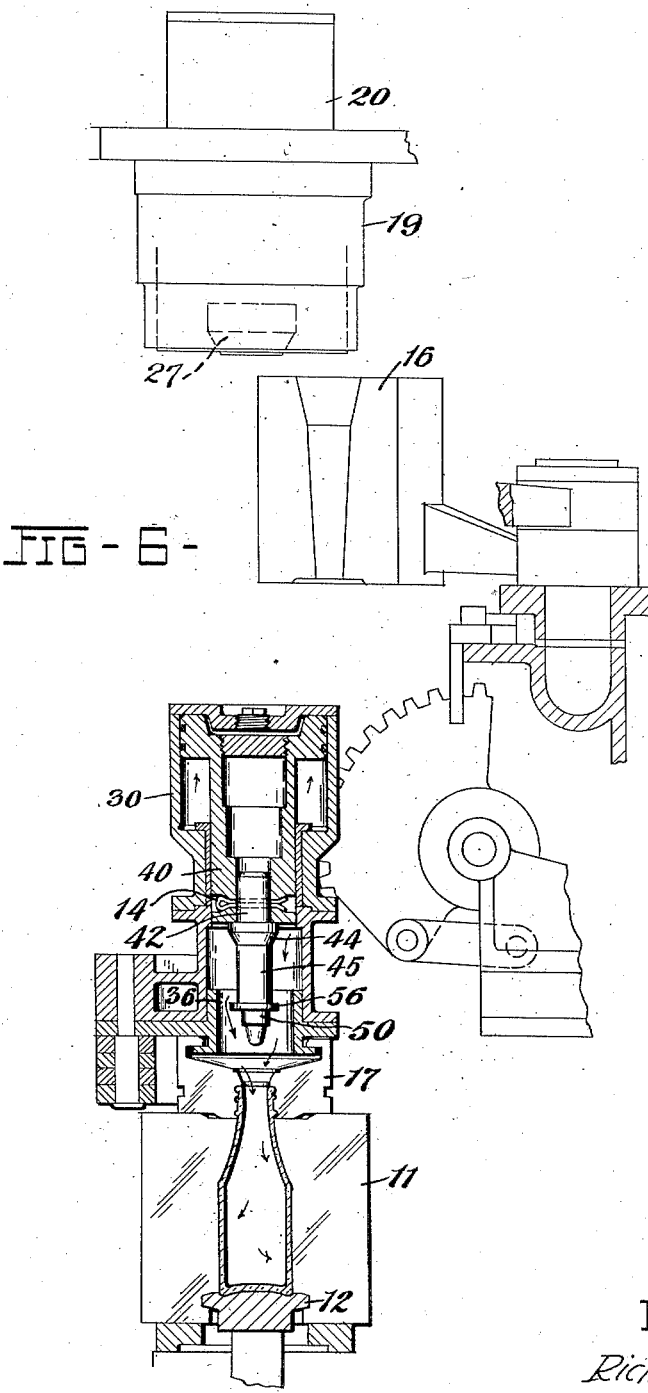
FIG-6-
INVENTOR
Richard LaFrance
BY J. F. Rule
HIS ATTY.

Patented June 25, 1929.

1,718,651

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed November 8, 1926. Serial No. 146,895.

My invention relates to improvements in glass forming machines of the type employed in making bottles and other glass articles which are blown in molds. In the type of machine in connection with which the present invention is herein shown, there is included a carriage which rotates continuously about a vertical axis, this carriage comprising a plurality of mold groups or units each including a blank mold in which a charge of glass is received and partially formed, a neck mold, and a finishing mold in which the parison is blown to its final shape. As the mold carriage rotates, the inverted blank molds are brought in succession to a charge receiving position, each with its upper end open to receive a charge of glass which is dropped therein from an automatic feeder.

When a blank mold has received its charge, a blow head is brought into position to close the charge receiving end of the inverted mold and air pressure is supplied through said head to compact the glass in the mold and at the same time form the neck of the bottle or other article in the neck mold which is beneath and in register with the blank mold. Air under pressure is thereafter supplied through the neck of the blank to blow the parison in the blank mold, thus partially forming the bottle or other article. The blank mold now opens, leaving the parison supported in and projecting upward from the neck mold. The neck mold turn-over group, including the neck mold and associated parts, is next rotated about a horizontal axis to invert the neck mold, thereby swinging the parison downward to a depending position. The bottom plate is now moved vertically into position and the finishing mold then closes around the bottom plate and the parison, and the latter is blown to its finished form, the neck mold is opened, and the turn-over group reinverted. After the blown article has cooled sufficiently to retain its shape, the mold opens, leaving the blown article supported on the mold bottom, and the latter is lowered and tilted to discharge the article from the machine.

In the formation of the parison in a machine of the above character, it has been the practice to project a plunger into the neck mold just prior to the delivery of a charge of molten glass into the blank mold. When the charge is delivered, a portion of the glass enters the neck mold and surrounds the plunger tip to form the neck of the bottle and incidentally the initial blow opening. It is the general practice to apply compressed air to the upper end of the delivered charge to compact the glass in the blank and neck molds and around the plunger tip. This blow-down operation is intended to insure the formation of a perfect neck and finish. Following this blow-down operation, the plunger tip is withdrawn and a blow-up operation takes place. This blow-up consists in the application of highly compressed air through the neck portion of the blank and into the initial blow opening to give the blank the shape of the blank mold.

As in such machines it is necessary to withdraw the plunger from the neck of the parison before the blow-up operation takes place, it has also been found necessary to allow sufficient time to elapse between the blow-down and blow-up operation to permit the glass forming the neck to harden or set, so that during the blow-up operation the neck of the parison will not be distorted. During this time interval, the glass forming the body of the parison is chilled and sets to a certain extent so that when the blow-up takes place, there is an uneven distribution of the glass in the walls of the parison, with a resultant uneven distribution in the finished article. If the blow-up operation takes place before the parison has had time to chill in this manner, the glass forming the neck portion, which is still highly plastic, cannot withstand the air pressure during such blow-up operation and frequently blows or stretches away from the neck mold, resulting in the production of ware having distorted necks or finishes.

An important object of the present invention is to eliminate the above noted objections by providing simple and effective means whereby the initial blow-up operation may be effected immediately following the said blow-down operation, before the glass is unduly chilled and without removing the plunger from the neck of the parison. The air pressure in the blow-up operation is gradually increased from a relatively low initial pressure.

Another feature of this invention consists in the retention of the plunger in direct contact with the neck of the parison during a major portion of the blow-up operation, whereby the glass in this particular area is chilled and sufficiently set to effectively resist the tendency of the final blow-up to stretch or distort the finish and neck portions.

Other objects of the invention will appear hereinafter.

In the accompanying drawings:

Figure 1 is a part sectional elevation illustrating a flow type machine to which my invention is applied.

Figure 2 is a detail sectional view showing the relation of parts just after the blow-down, or glass compacting operation.

Figure 3 is a detail sectional elevation showing the manner in which the initial blow is given a parison.

Figure 4 is a detail sectional view of the plunger tip and valve in the position shown in Fig. 3.

Figure 5 is a detail sectional view showing the plunger tip withdrawn to allow final blowing of the parison by high pressure air, and Figure 6 is a sectional elevation showing the turnover inverted and the manner in which the parison is blown to form a finished article.

Referring to the accompanying drawings, the machine comprises a continuously rotating carriage including a lower section 10 carrying the finishing molds 11 and bottom plates 12; an intermediate section 15 on which the blank molds 16 and neck mold turn-overs 17 are supported, and an upper section 18 which supports the blowing heads 19 and funnel guides 28. The carriage rotates continuously about a vertical axis and is driven from any suitable source of power transmitted through a pinion 21 and ring gear 22.

Rotation of the mold carriage brings the blank molds 16 in succession to a charge receiving position beneath a feeder boot 25 which may be of any preferred construction and which is operated in synchronism with the movement of the mold carriage, to drop a charge of molten glass into each blank mold as the latter reaches its charge receiving position. Associated with each blank mold 16 is a funnel guide 28, through which the charge of molten glass is dropped and by which it is guided into the mold. Each funnel guide 28 is mounted in a supporting plate 26 slidable radially of the mold carriage in suitable guides on the upper section 18 of the mold carriage. Each of these plates 26 also carries a blow head 19, including an air motor 20 operable at intervals by a cam mechanism to move a closure plate 27 into position to close the charge receiving end of the blank mold. Just before the blank mold is so closed, air pressure is supplied to the upper end of the mold cavity to provide for blowing down or compacting the glass in the two molds in the manner disclosed in Cramer Patent No. 1,590,423, June 29, 1926. This blow head 19 is moved outward over the mold just after the funnel guide has served the purpose of directing a charge into the blank mold and upon moving outwardly a predetermined distance, assumes the position shown in Figs. 2 and 3.

Prior to my invention, it has been the practice to follow the blow-down operation by withdrawal of the plunger tip and then a blow-up operation consisting in the application of highly compressed air into the initial blow opening which has been formed by the plunger tip. The objections to this procedure have been heretofore pointed out. According to the present invention, the turnover unit, which includes an air piston motor 30 and a plunger carrier, is equipped with a removable plunger of novel formation permitting its retention in the neck mold during charging of the blank and neck molds, the blow-down operation, and a major portion of, or perhaps during the entire, blow-up operation.

The casing of the air motor 30 is provided with trunnions 31 and 32 mounted on shafts 33 and 34, respectively, such construction permitting the turn-over to oscillate about the shafts in the usual manner for the purpose of inverting and reinverting the neck mold. Suitable cam mechanism controls the movements of the turn-over unit. The passageways through the shaft 34 provide for supply of air to the air motor 30 for the purpose of reciprocating the plunger carrier, while the passageway 35 through the other shaft 33 communicates with the chamber 36 at the upper end of the motor casing, in which chamber a major portion of the plunger is normally located. Communication between this chamber 36 and the passageway 35 through the shaft 33 permits supply of air pressure to the former at proper intervals. The plunger carrier 40 or piston is formed with a central longitudinal opening 41 in which a shank 42 of the plunger 43 is fitted. A cotter pin 14 may be employed to releasably interconnect the plunger and the reciprocable carrier 40.

This plunger 43 is formed with a head 44 providing an annular shoulder surrounding the upper end of the shank 42 and resting upon the upper end of the plunger carrier 40. Rising from this head 44 and axially aligned with the shank 42 and the plunger carrier, is a cylindrical body 45 having a central longitudinal recess 46 whose lower end may terminate in the head portion 44. A vent 66 provides communication between the recess 46 and the chamber 36 to prevent air compression in the recess as will be evident hereinafter.

A separable plunger tip 50 is provided with a shank 51 which is externally threaded for engagement with threads formed on the wall of the recess 46 in the plunger body 45. This plunger tip 50 is tapered upwardly for obvious reasons and is provided with a central passageway 52 opening through the outer end of the tip. The passageway is decreased in diameter near its lower end to provide an annular shoulder or stop 53 whose function is to engage a head or guide 65 limiting downward or closing movement of a valve 60 as will be apparent. The upper end of this passageway 52 is enlarged to form a chamber 54 to receive a valve 60. Adjacent the lower end of the body of the removable tip portion 50, a plurality of radial openings 55 are formed to provide communication between the elongated passageway 52 and the chamber 36 at the upper end of the motor casing. A radial annular rib 56 is formed on the body just above these openings to limit projection of the plunger tip into the neck mold cavity. The valve 60 is normally positioned within the chamber 54, and is yieldably retained therein by a spring surrounding the lower end of a valve stem 61, which extends through and below the lower end of the passageway 52 in the plunger tip. This stem projects into the recess 46 formed in the plunger body and it is within this recess that the coil spring 63 is arranged around said stem and held thereon by a retaining collar 64. A fluted or spider-like guide or head 65 is carried by an intermediate portion of the valve stem 61 and when the valve is in its lowermost position, this head engages the stop 53 to prevent further downward or closing movement of the valve.

After a charge of glass has been delivered to the blank and neck molds and while the plunger tip is still retained in the neck mold cavity, the blow-down operation takes place and compacts the glass in the lower end of the blank mold and around the plunger tip. Before the glass has an opportunity to set, and without removing the plunger tip from the neck, suitable means (not shown) is actuated to supply air under pressure through the passageway 35 in the shaft 33 to the chamber 36 in the upper end of the motor casing. From this chamber, the air is forced into the passageway 52 in the plunger tip by way of the radial openings 55, causing outward movement of the valve 60 and consequent formation of an initial blow opening in the neck of the parison (Figs. 3, 4 and 5). Preferably, the initial blow-up is by low pressure, the degree being gradually increased as the blank assumes form. Simultaneously with formation of this initial blow opening by the injected air pressure, the blank is expanded to its final form (see Fig. 3). During this blow-up operation, the finish and neck portions of the blank are completely protected against stretching or distortion in any manner and furthermore are properly chilled and set by contact with the plunger tip. Thus, the retention of this plunger tip in the neck mold during the blow-up operation, serves a two-fold purpose and insures production of ware in which the finish and neck portion are perfectly formed. The quick change from the blow-down to the blow-up operations quickly reverses the glass movement, prevents premature setting of the glass and avoids uneven distribution of glass in the ware.

Following the blow-up operation above described, suitable cam mechanism (not shown) is actuated to open a valve and thereby supply air to the motor 30, causing withdrawal of the plunger tip from the neck mold cavity. If desired, this retraction of the plunger tip may be immediately followed by a short puff of highly compressed air to give the blank a final setting, though this may be unnecessary. The blow head 19 is then lifted out of engagement with the blank mold and after the blank mold sections have separated, the turn-over unit is inverted to suspend the bare parison to be enclosed in the finishing mold 11 and blown to the form of the ware being produced (Fig. 6). After the ware has been blown to its final form in the finishing mold, the mold sections are separated and the ware may be ejected in any approved manner.

Although the present invention is herein shown and described as embodied in a particular type of machine, it is not limited to the particular construction shown, but the principles thereof may be embodied in other forms and types of machines, and various modifications may be resorted to within the spirit and scope of the invention.

What I claim is:

1. In a glass forming machine, a blank mold having an open upper charge receiving end, a neck mold cooperating with the lower end of the blank mold, an air motor having a chamber at its upper end communicating with the neck mold cavity, a plunger arranged in said chamber and having a tip movable into and out of the neck mold cavity by action of said motor, a passageway through the tip forming communication between said chamber and the neck mold cavity, and means including a passageway through the motor casing permitting delivery of air pressure to the chamber, said passageway through the tip including interconnected longitudinal and radial openings, the former opening through the outer end of the plunger tip and the latter opening radially into the aforementioned chamber, and an automatic valve adapted at times to close the longitudinal passageway.

2. In glass forming apparatus, a plunger tip adapted to coact with a mold in forming blown glassware, said tip having a longitudinal passageway extending therethrough, a radial opening communicating with said passageway, a valve disk movable into and out of the tip end of said passageway, a stem carrying the valve and reciprocable through said passageway, one end of said stem extending beyond the inner end of the tip, spring means on said extended end for normally and yieldably holding the valve in position to close the passageway, a stop formed on the wall of said passageway, and means spaced from the valve disk carried by said stem and engageable at times with the stop to limit the closing movement of said valve disk, said longitudinal passageway having its outer end enlarged to form a chamber permitting movement of the valve disk to a position substantially entirely within the tip.

3. In a glass forming machine, a mold, a plunger tip movable into and out of the mold, means for charging the mold while said tip projects thereinto, means for compacting the charge around the tip, and means operable simultaneously with completion of the compacting operation to direct compressed air through the tip into the mold.

4. In a glass forming machine, a mold adapted to receive a charge of glass, a plunger tip at one end of the mold adapted to form an initial blow opening, means for moving the glass to compact it around the tip, and additional means operable simultaneously with completion of the compacting operation to reverse movement of the glass.

5. In a glass forming machine, a mold having an open upper charge receiving end, a plunger tip movable into and out of the other end of said mold, means for delivering a charge of glass through said upper end, means for moving the glass in the lower end and compacting portions around said plunger, and means for applying progressively increasing degrees of air pressure through said lower end to reverse the movement of the glass, said last named application of air beginning substantially simultaneously with completion of the compacting operation.

Signed at Toledo, in the county of Lucas and State of Ohio, this 30th day of October, 1926.

RICHARD LA FRANCE.